(12) United States Patent
Du et al.

(10) Patent No.: US 9,038,143 B2
(45) Date of Patent: May 19, 2015

(54) METHOD AND SYSTEM FOR NETWORK ACCESS CONTROL

(75) Inventors: Zhiqiang Du, Shaanxi (CN); Manxia Tie, Shaanxi (CN); Zhenhai Huang, Shaanxi (CN); Jun Cao, Shaanxi (CN)

(73) Assignee: China IWNCOMM Co., Ltd. (CN)

( * ) Notice: Subject to any disclaimer, the term of this patent is extended or adjusted under 35 U.S.C. 154(b) by 131 days.

(21) Appl. No.: 13/879,136

(22) PCT Filed: Mar. 15, 2011

(86) PCT No.: PCT/CN2011/071821
§ 371 (c)(1),
(2), (4) Date: Apr. 12, 2013

(87) PCT Pub. No.: WO2012/048552
PCT Pub. Date: Apr. 19, 2012

(65) Prior Publication Data
US 2013/0205374 A1 Aug. 8, 2013

(30) Foreign Application Priority Data

Oct. 13, 2010 (CN) .......................... 2010 1 0504262
Oct. 13, 2010 (CN) .......................... 2010 1 0505950
Oct. 13, 2010 (CN) .......................... 2010 1 0506041

(51) Int. Cl.
*G06F 7/04* (2006.01)
*H04L 29/06* (2006.01)

(52) U.S. Cl.
CPC .................................... *H04L 63/08* (2013.01)

(58) Field of Classification Search
CPC ... H04L 12/66; H04L 63/105; H04L 63/0227; H04L 63/08; H04L 63/083; H04L 63/168
USPC .......................................................... 726/4
See application file for complete search history.

(56) References Cited

U.S. PATENT DOCUMENTS

2006/0174322 A1 8/2006 Turner et al.
2007/0277228 A1* 11/2007 Curtis et al. ..................... 726/4

(Continued)

FOREIGN PATENT DOCUMENTS

CN 1783780 A 6/2006
CN 1875598 A 12/2006

(Continued)

OTHER PUBLICATIONS

Huang Zhenhai, et. al., The progress of Tri-element Peer Authentication (TePA) and Access Control Method, *Information Technology & Standardization*, vol. 6, 2009, pp. 21-23.

*Primary Examiner* — Dant Shaifer Harriman
*Assistant Examiner* — Abiy Getachew
(74) *Attorney, Agent, or Firm* — DLA Piper LLP (US)

(57) ABSTRACT

A method and a system for network access control are provided, which are based on cipher code mechanism. After a visitor has raised an access request, an access controller in the destination network processes the access request and initiates an authentication request on the visitor identity to an authentication server through the visitor. The access controller in the destination network accomplishes the authentication on the visitor identity according to the public authentication result of the authentication server transferred by the visitor, and performs according to the authorization policy the authorization management on the successfully authenticated visitor. The present invention solves the problem of incapableness of performing the access control when the access controller can not directly use the authentication service provided by the authentication server. The present invention can sufficiently satisfy the real application requirements of access control on visitor.

10 Claims, 4 Drawing Sheets

(56) References Cited

U.S. PATENT DOCUMENTS

2010/0263023 A1* 10/2010 Xiao et al. .................. 726/3
2011/0238996 A1* 9/2011 Xiao et al. .................. 713/175

FOREIGN PATENT DOCUMENTS

| | | |
|---|---|---|
| CN | 1996842 A | 7/2007 |
| CN | 101431517 A | 5/2009 |
| CN | 101547444 A | 9/2009 |
| CN | 101572704 A | 11/2009 |
| CN | 101631114 A | 1/2010 |
| CN | 101958908 A | 1/2011 |
| CN | 101958908 B | 8/2012 |
| EP | 2442516 A1 * | 4/2012 |
| JP | 8-297638 | 11/1996 |
| JP | 8-335208 | 12/1996 |
| JP | 2010-534988 | 11/2010 |
| WO | 2009/109136 | 9/2009 |

\* cited by examiner

METHOD AND SYSTEM FOR NETWORK ACCESS CONTROL

This application is a US National Stage of International Application No. PCT/CN2011/071821, filed on 15 Mar. 2011, designating the United States, and claiming priority from Chinese Patent Applications No. 201010506041.X and entitled "Method and System for Network Access Control", No. 201010504262.3 and entitled "A Method and System for Network Access Control", and No. 201010505950.1 and entitled "A Method and System for Access Control", all of which are filed with the Chinese Patent Office on Oct. 13, 2010 and herein incorporated by reference in their entireties.

FIELD OF THE INVENTION

The present invention relates to the field of network security applications in information security technologies and particularly to a method and system for network access control.

BACKGROUND OF THE INVENTION

In an existing network access control method, typically an access controller in a destination network authenticates and authorizes a requester after the requester initiates an access request to the destination network to thereby perform access control on the requester. In an access control scenario where a third party, e.g., an authentication server, is required to participate in identity authentication, the access controller may fail to be connected directly with the authentication server due to the access controller itself or the destination network and consequently can not use directly the authentication service provided by the authentication server. In this situation, the access control method in the prior art in which the access controller is directly connected to the authentication server and uses the authentication service provided by the authentication server can not satisfy a practical application demand for the access control on the requester.

SUMMARY OF THE INVENTION

In order to address the foregoing technical problem in the background art, the invention provides a method and system for access control which can satisfy an application demand for access control on a requester.

The invention provides a method for network access control including:

step 1), sending, by a requester, an access request message to an access controller of a destination network, wherein the access request message comprises an access request of the requester;

step 2), constructing, by the access controller, an access authentication request message comprising first identity authentication information and sending the access authentication request message to the requester after receiving the access request message, wherein the first identity authentication information is identity authentication information of the access controller;

step 3), constructing, by the requester, an identity authentication request message and sending the identity authentication request message to an authentication server of the destination network after receiving the access authentication request message, wherein the identity authentication request message comprises the first identity authentication information and second identity authentication information, and the second identity authentication information is identity authentication information of the requester;

step 4), generating, by the authentication server, a first authentication result after authentication on the access controller according to the first identity authentication information and generating a second authentication result after authentication on the requester according to the second identity authentication information, after receiving the identity authentication request message; and constructing, by the authentication server, an identity authentication response message and sending the identity authentication response message to the requester, wherein the identity authentication response message comprises the first authentication result and the second authentication result;

step 5), constructing, by the requester, an access authentication response message according to the first authentication result and sending the access authentication response message to the access controller after receiving the identity authentication response message, wherein the access authentication response message comprises the second authentication result; and step 6), constructing, by the access controller, an access response message according to the second authentication result and an authorization policy and sending the access response message to the requester after receiving the access authentication response message, wherein the authorization policy is a policy for the access controller to authorize the access request.

The invention further provides an access apparatus including:

an access request interacting module configured to send an access request message to an access controller of a destination network and to receive an access authentication request message comprising first identity authentication information sent from the access controller, wherein the first identity authentication information is identity authentication information of the access controller;

an authentication request interacting module configured to send an identity authentication request message to an authentication server of the destination network, wherein the identity authentication request message comprises the first identity authentication information and second identity authentication information, and the second identity authentication information is identity authentication information of the requester; and to receive an identity authentication response message sent from the authentication server, wherein the identity authentication response message comprises a first authentication result after identity authentication on the access controller according to the first identity authentication information and a second authentication result after identity authentication on the requester according to the second identity authentication information; and an authentication result interacting module configured to construct an access authentication response message comprising the second authentication result according to the first authentication result and send the access authentication response message to the access controller, and to receive an access response message sent from the access controller.

The invention further provides an authentication server including:

an authentication request receiving module configured to receive an identity authentication request message sent from a requester, wherein the identity authentication request message comprises first identity authentication information of an access controller of a destination network and second identity authentication information of the requester;

an authentication performing module configured to generate a first authentication result after identity authentication on the access controller according to the first identity authentication information and to generate a second authentication result after identity authentication on the requester according to the second identity authentication information; and an authentication response sending module configured to construct an identity authentication response message and send the identity authentication response message to the requester, wherein the identity authentication response message comprises the first authentication result and the second authentication result.

The invention further provides an access controller including:

an access request receiving module configured to receive an access request message sent from a requester;

an access authentication request constructing module configured to construct an access authentication request message comprising first identity authentication information and send the access authentication request message to the requester, wherein the first identity authentication information is identity authentication information of the access controller;

an access authentication response receiving module configured to receive an access authentication response message sent from the requester to obtain a second authentication result, wherein the access authentication response message is constructed by the requester according to a first authentication result, and the first authentication result and the second authentication result are sent from an authentication server to the requester in an identity authentication response message; and wherein the first authentication result is generated by the authentication server after performing identity authentication on the access controller according to the first identity authentication information comprised in an identity authentication request message sent from the requester, and the second authentication result is generated by the authentication server after performing identity authentication on the requester according to second identity authentication information comprised in the identity authentication request message; and an access response sending module configured to construct an access response message according to the obtained second authentication result and an authorization policy and send the access response message to the requester.

The invention further provides a system for network access control, including a requester, and an access controller and an authentication server of a destination network, wherein:

the requester is configured to send an access request message to the access controller and to receive an access authentication request message comprising first identity authentication information sent from the access controller, wherein the first identity authentication information is identity authentication information of the access controller;

to send an identity authentication request message comprising the first identity authentication information and second identity authentication information to the authentication server, wherein the second identity authentication information is identity authentication information of the requester, and to receive an identity authentication response message comprising a first authentication result and a second authentication result sent from the authentication server; and to construct an access authentication response message comprising the second authentication result according to the first authentication result and send the access authentication response message to the access controller, and to receive an access response message sent from the access controller;

the access controller is configured to receive the access request message and to send the access authentication request message; and to receive the access authentication response message sent from the requester to obtain the second authentication result, and to construct the access response message according to the obtained second authentication result and an authorization policy and send the access response message to the requester; and the authentication server is configured to perform identity authentication on the access controller according to the first identity authentication information sent from the requester to obtain the first authentication result, to perform identity authentication on the requester according to the second identity authentication information sent from the requester to obtain the second authentication result, and to send the identity authentication response message comprising the first authentication result and the second authentication result to the requester.

Advantages of the invention are as follows:

In the method and system for network access control proposed in the invention, the method for network access control for identity authentication on the requester is performed in the case that the authentication server is involved and the access controller of the destination network can not use directly the authentication service provided by the authentication server. The invention is based upon a cipher code mechanism, and after the requester raises an access request, the access controller in the destination network processes the access request and initiates an authentication request on the identity of the requester to the authentication server through the requester, and the access controller in the destination network accomplishes the authentication on the identity of the requester according to authentication results of the authentication server that can be disclosed transferred by the requester and performs authorization management on the successfully authenticated requester according to an authorization policy. The invention addresses the problem of incapableness of performing the access control when the access controller can not directly use the authentication service provided by the authentication server, and the invention can sufficiently satisfy a practical application demand for the access control on the requester.

DETAILED DESCRIPTION OF THE EMBODIMENTS

Figure 1:
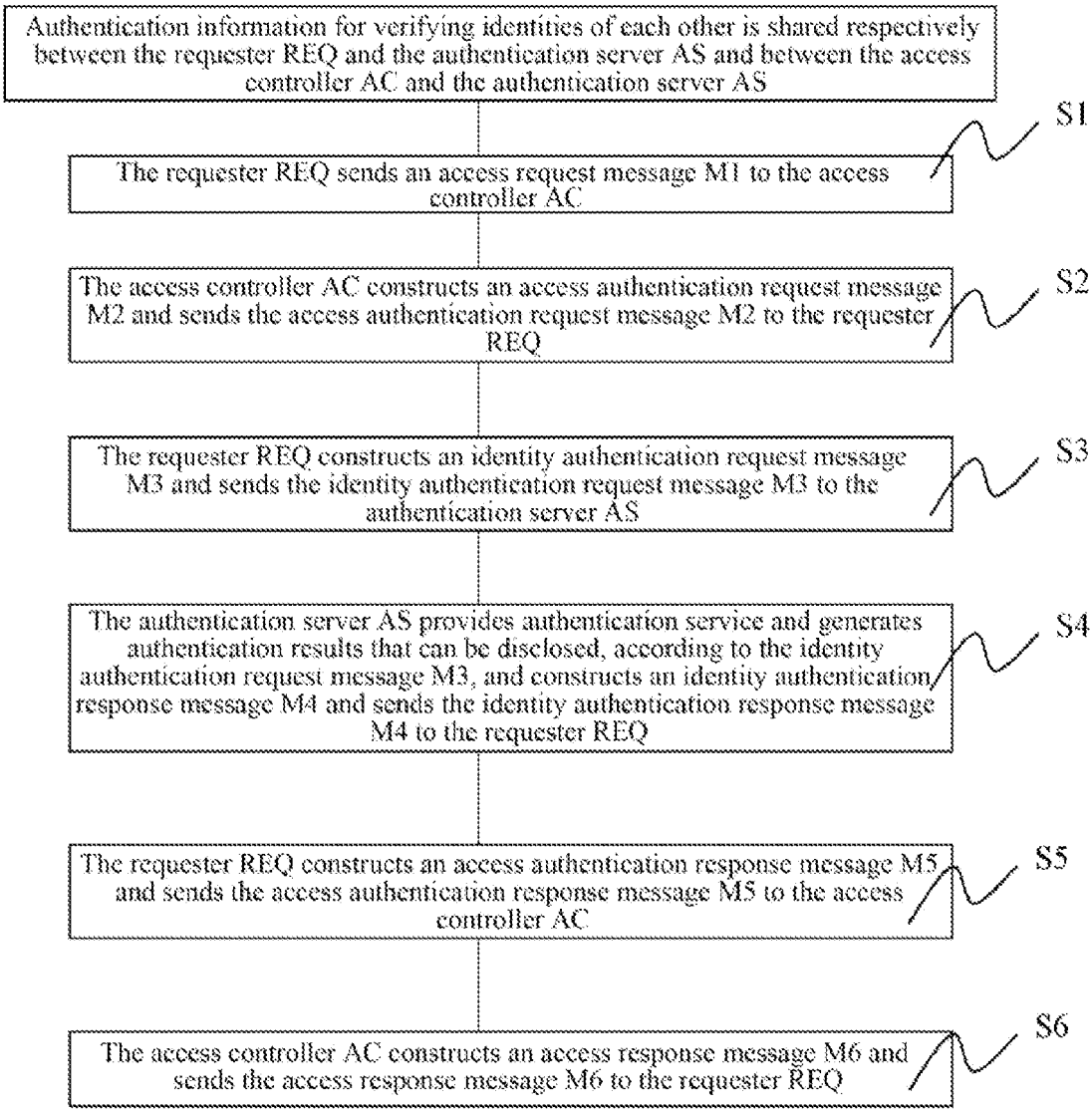
FIG. 1 is a flow chart of a method for network access control according to the invention.
Figure 2:
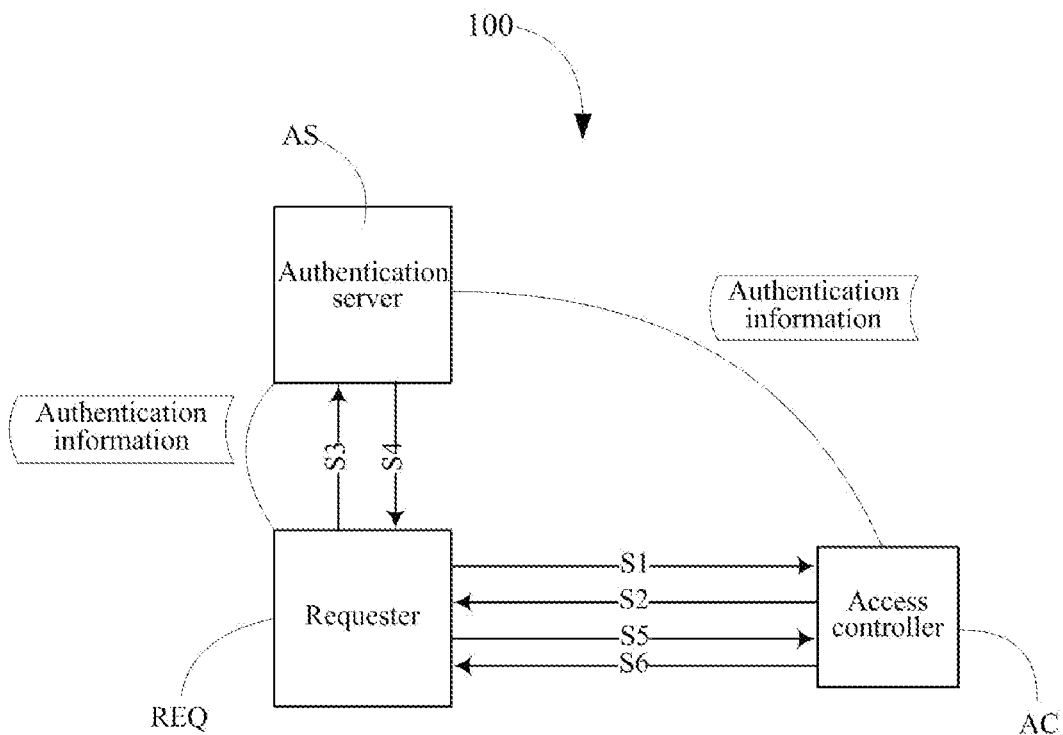
FIG. 2 is a simplified working diagram of a system for network access control according to the invention.

Referring to FIG. 2, the invention provides a network access control system 100. The access control system 100 includes a requester REQ, an authentication server AS and an access controller AC. Prior to operation of the system 100, authentication information for verifying identities of each other has been shared respectively between the requester REQ and the authentication server AS and between the access controller AC and the authentication server AS.

Referring to FIG. 1 and FIG. 3 to FIG. 8, the network access control system 100 accomplishes authentication and authorization on the requester REQ in six steps S1 to S6.

Figure 3:
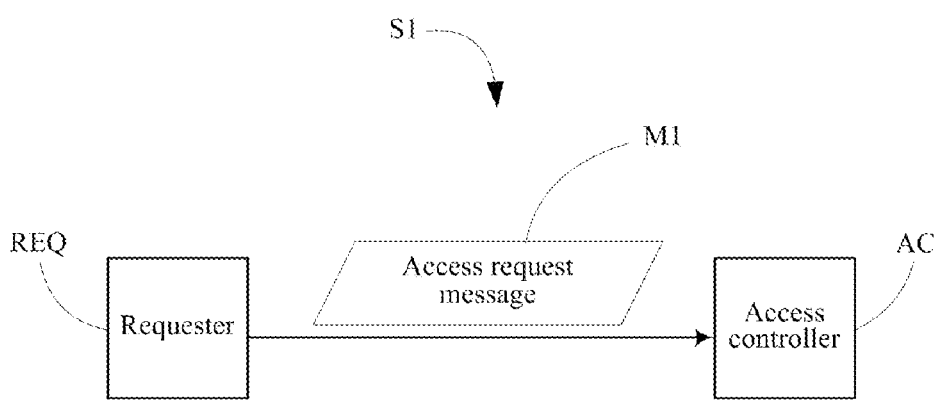
FIG. 3 is a detailed block diagram of the step S1 in FIG. 2.

Step S1: referring to FIG. 3, the requester REQ sends an access request message M1 to the access controller AC of a destination network. The access request message M1 includes $Q_{REQ}$, wherein $Q_{REQ}$ represents an access request of the requester REQ both here and hereinafter.

Figure 4:
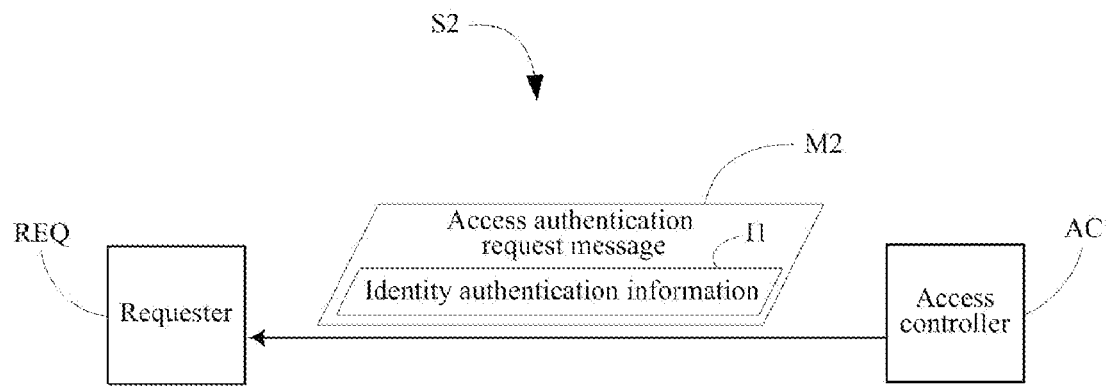
FIG. 4 is a detailed block diagram of the step S2 in FIG. 2.

Step S2: referring to FIG. 4, the access controller AC of the destination network constructs an access authentication request message M2 and sends the access authentication request message M2 to the requester REQ after receiving the access request message M1. The access authentication request message M2 includes identity authentication information I1 of the access controller AC, and the identity authentication information I1 is used to testify identity legality of the access controller AC to the authentication server AS.

Figure 5:
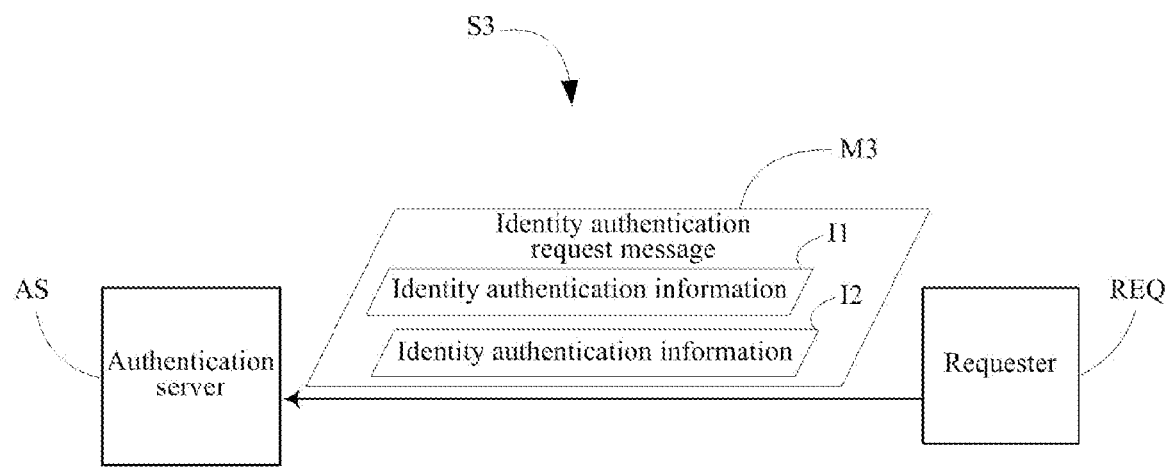
FIG. 5 is a detailed block diagram of the step S3 in FIG. 2.

Step S3: referring to FIG. 5, the requester REQ constructs an identity authentication request message M3 and sends the identity authentication request message M3 to the authentication server AS after receiving the access authentication request message M2, wherein the identity authentication request message M3 includes the identity authentication information I1 and identity authentication information I2 of the requester REQ. The identity authentication information I2 is used to testify identity legality of the requester REQ to the authentication server AS.

Figure 6:
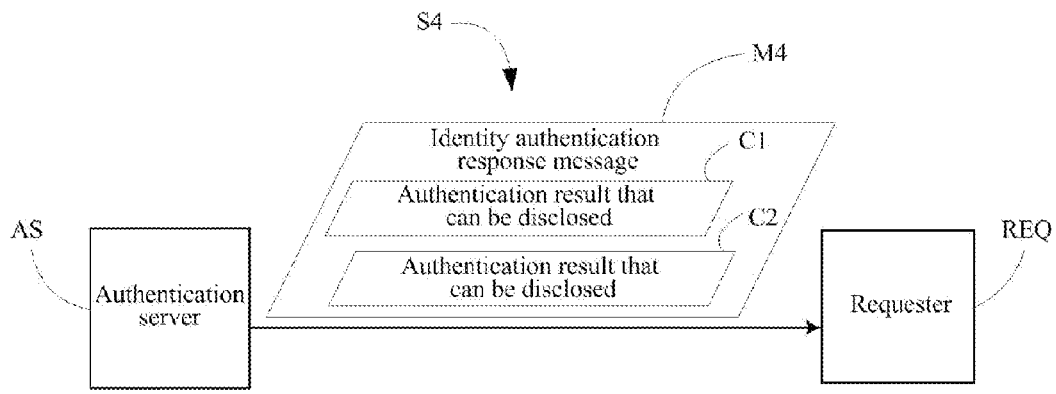
FIG. 6 is a detailed block diagram of the step S4 in FIG. 2.

Step S4: referring to FIG. 6, the authentication server AS provides authentication service and generates authentication results that can be disclosed, according to the identity authentication request message M3, that is, generates an authentication result C1 that can be disclosed for the access controller AC and an authentication result C2 that can be disclosed for the requester REQ according to the identity authentication information I1 and I2 in the identity authentication request message M3, and the authentication server AS constructs an identity authentication response message M4 according to the authentication results C1 and C2 that can be disclosed and sends the identity authentication response message M4 to the requester REQ, wherein the identity authentication response message M4 includes the authentication results C1 and C2 that can be disclosed.

Figure 7:
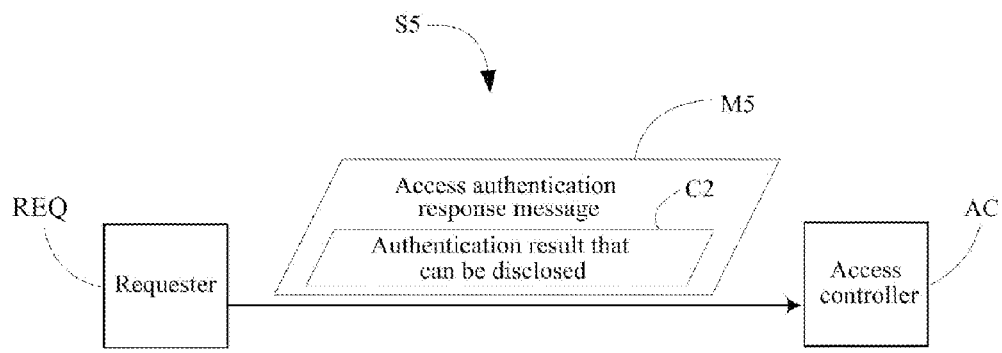
FIG. 7 is a detailed block diagram of the step S5 in FIG. 2.

Step S5: referring to FIG. 7, the requester REQ constructs an access authentication response message M5 according to the authentication result C1 that can be disclosed and sends the access authentication response message M5 to the access controller AC of the destination network after receiving the identity authentication response message M4, wherein the access authentication response message M5 includes the authentication result C2 that can be disclosed.

Figure 8:
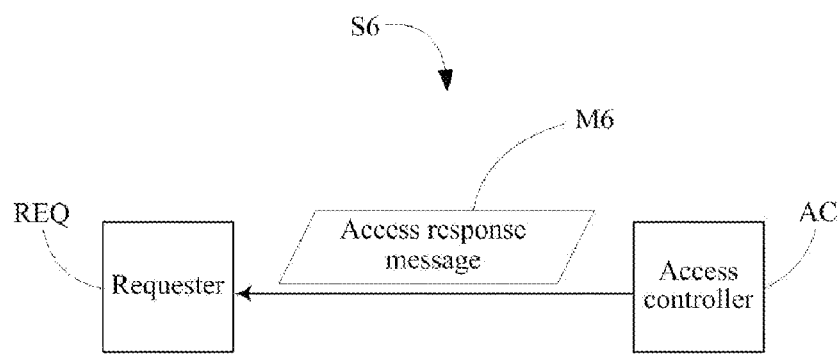
FIG. 8 is a detailed block diagram of the step S6 in FIG. 2.

Step S6: referring to FIG. 8, the access controller AC constructs an access response message M6 according to the authentication result C2 that can be disclosed of the authentication server AS and an authorization policy, and sends the access response message M6 to the requester REQ. Thus the inventive process of authenticating and authorizing the requester REQ has been accomplished, wherein the authorization policy refers to a policy for the access controller AC to authorize the access request $Q_{REQ}$ of the requester REQ, and the authorization policy may be from a server, e.g., the authentication server AS, or from the access controller AC locally. The authorization policy has been built in the authentication server AS or the access controller AC in advance and is simply invoked in the invention.

The system 100 is operated in the method illustrated in the steps S1 to S6 to thereby achieve the authentication and authorization on the requester REQ to satisfy a practical application demand for the access controller on the requester.

Based upon the foregoing method according to the invention, the invention further provides an access apparatus including:

an access request interacting module configured to send an access request message to an access controller of a destination network and to receive an access authentication request message comprising first identity authentication information sent from the access controller, wherein the first identity authentication information is identity authentication information of the access controller;

an authentication request interacting module configured to send an identity authentication request message to an authentication server of the destination network, wherein the identity authentication request message comprises the first identity authentication information and second identity authentication information, and the second identity authentication information is identity authentication information of the requester; and to receive an identity authentication response message sent from the authentication server, wherein the identity authentication response message comprises a first authentication result after identity authentication on the access controller according to the first identity authentication information and a second authentication result after identity authentication on the requester according to the second identity authentication information; and an authentication result interacting module configured to construct an access authentication response message comprising the second authentication result according to the first authentication result and send the access authentication response message to the access controller, and to receive an access response message sent from the access controller.

Correspondingly, the invention further provides an authentication server including:

an authentication request receiving module configured to receive an identity authentication request message sent from a requester, wherein the identity authentication request message comprises first identity authentication information of an access controller of a destination network and second identity authentication information of the requester;

an authentication performing module configured to generate a first authentication result after identity authentication on the access controller according to the first identity authentication information and to generate a second authentication result after identity authentication on the requester according to the second identity authentication information; and an authentication response sending module configured to construct an identity authentication response message and send the identity authentication response message to the requester, wherein the identity authentication response message comprises the first authentication result and the second authentication result.

Correspondingly, the invention further provides an access controller including:

an access request receiving module configured to receive an access request message sent from a requester;

an access authentication request constructing module configured to construct an access authentication request message comprising first identity authentication information and send the access authentication request message to the requester, wherein the first identity authentication information is identity authentication information of the access controller;

an access authentication response receiving module configured to receive an access authentication response message sent from the requester to obtain a second authentication result, wherein the access authentication response message is constructed by the requester according to a first authentication result, and the first authentication result and the second authentication result are sent from an authentication server to the requester in an identity authentication response message; and wherein the first authentication result is generated by the authentication server after performing identity authentication on the access controller according to the first identity authentication information comprised in an identity authentication request message sent from the requester, and the second authentication result is generated by the authentication server after performing identity authentication on the requester according to second identity authentication information comprised in the identity authentication request message; and an access response sending module configured to construct an access response message according to the obtained second authentication result and an authorization policy and send the access response message to the requester.

Based upon the foregoing method according to the invention, a system for network access control, which has corresponding functions, includes a requester, and an access controller and an authentication server of a destination network, wherein:

the requester is configured to send an access request message to the access controller and to receive an access authentication request message comprising first identity authentication information sent from the access controller, wherein the first identity authentication information is identity authentication information of the access controller;

to send an identity authentication request message comprising the first identity authentication information and second identity authentication information to the authentication server, wherein the second identity authentication information is identity authentication information of the requester, and to receive an identity authentication response message comprising a first authentication result and a second authentication result sent from the authentication server; and to construct an access authentication response message comprising the second authentication result according to the first authentication result and send the access authentication response message to the access controller, and to receive an access response message sent from the access controller;

the access controller is configured to receive the access request message and to send the access authentication request message; and to receive the access authentication response message sent from the requester to obtain the second authentication result, and to construct the access response message according to the obtained second authentication result and an authorization policy and send the access response message to the requester; and the authentication server is configured to perform identity authentication on the access controller according to the first identity authentication information sent from the requester to obtain the first authentication result, to perform identity authentication on the requester according to the second identity authentication information sent from the requester to obtain the second authentication result, and to send the identity authentication response message comprising the first authentication result and the second authentication result to the requester.

The steps S1 to S6 in the foregoing method for network access control will be detailed below in particular embodiments.

First Embodiment

Preferably, a particular embodiment of the step S1 is as follows:

The requester REQ constructs $N_{REQ}\|Q_{REQ}$ and sends $N_{REQ}\|Q_{REQ}$ to the access controller AC, and in this embodiment, $N_{REQ}\|Q_{REQ}$ is the access request message M1, whereas in another embodiment, the request message M1 can alternatively be another message, and the another message includes at least $N_{REQ}\|Q_{REQ}$.

Wherein $N_{REQ}$ represents a random number generated by the requester REQ, and "$\|$" represents concatenation of two consecutive pieces of information, both here and hereinafter.

Preferably, a particular embodiment of the step S2 is as follows:

The access controller AC constructs the access authentication request message M2, i.e., $N_{REQ}\|N_{AC}\|IA_{AC}$, and sends $N_{REQ}\|N_{AC}\|IA_{AC}$ to the requester REQ after receiving the access request message M1, i.e., $N_{REQ}\|Q_{REQ}$, of the requester REQ, and in another embodiment, the access authentication request message M2 is a message including at least $N_{REQ}\|N_{AC}\|IA_{AC}$.

Wherein $N_{AC}$ represents a random number generated by the access controller AC, and $IA_{AC}$ represents identity authentication information of the access controller AC, i.e., the identity authentication information I1, which is a result generated by the access controller AC through a cipher code operation using the authentication information shared with the authentication server AS or is identity authentication information that can be sent directly to the authentication server AS without the cipher code operation to testify identity legality of the access controller AC to the authentication server AS.

Preferably, a particular embodiment of the step S3 is as follows:

After receiving the access authentication request message M2, i.e., $N_{REQ}\|N_{AC}\|IA_{AC}$, of the access controller AC, the requester REQ firstly determines whether $N_{REQ}$ is the random number generated by the requester REQ, and if not so, then discards the authentication request message M2; otherwise, generates identity authentication information $IA_{REQ}$ of the requester REQ through a cipher code operation using the authentication information shared with the authentication server AS, or identity authentication information $IA_{REQ}$ of the requester REQ that can be sent directly to the authentication server AS without the cipher code operation, i.e., the identity authentication information I2. Then the requester REQ constructs the identity authentication request message M3, i.e., $ID_{AC}\|N_{REQ}\|IA_{REQ}\|IA_{AC}$, and sends $ID_{AC}\|N_{REQ}\|IA_{REQ}\|IA_{AC}$ to the authentication server AS.

Wherein $ID_{AC}$ represents an identity identifier of the access controller AC both here and hereinafter.

In another embodiment, the identity authentication request message M3 is a message including at least $ID_{AC}\|N_{REQ}\|IA_{REQ}\|IA_{AC}$.

Preferably, a particular embodiment of the step 4) is as follows:

4.1) After receiving the identity authentication request message M3, i.e., $ID_{AC}\|N_{REQ}\|IA_{REQ}\|IA_{AC}$, of the requester REQ, the authentication server AS firstly authenticates the identity of the access controller AC according to $IA_{AC}$, and if the identity of the access controller AC is illegal, then performs 4.2); or if the identity of the access controller AC is legal, then performs 4.3).

4.2) The authentication server AS constructs the identity authentication response message M4, i.e., $ID_{AC}\|N_{REQ}\|Res(AC)\|Res(REQ)$, and sends $ID_{AC}\|N_{REQ}\|Res(AC)\|Res(REQ)$ to the requester REQ, wherein in this embodiment, Res(AC) is the authentication result C1 that can be disclosed, and Res(REQ) is the authentication result C2 that can be disclosed, both here and hereinafter; Res(AC) is an authentication result of the authentication server AS on the access controller AC or a result generated through a cipher code operation on the authentication result of the access controller AC using the authentication information shared with the requester REQ both here and hereinafter; and Res(REQ) is an authentication result of the authentication server AS on the requester REQ or a result generated through a cipher code operation on the authentication result of the requester REQ using the authentication information shared with the access controller AC, both here and hereinafter; and at this time, the authentication result of the authentication server AS on the access controller AC is "Failure" indicating that the authentication server AS authenticates the access controller AC with failure, that is, the access controller AC is illegal, and the authentication result of the authentication server AS on the requester REQ is "Null" indicating that there is no authentication result.

4.3) The authentication server AS authenticates the identity of the requester REQ, and if the identity of the requester REQ is illegal, then performs 4.3.1); or if the identity of the requester REQ is legal, then performs 4.3.2).

4.3.1) The authentication server AS constructs the identity authentication response message M4, i.e., $ID_{AC}||||N_{REQ}Res(AC)||||Res(REQ)$, and sends $ID_{AC}||||N_{REQ}||||Res(AC)||||Res(REQ)$ to the requester REQ. At this time, the authentication result of the authentication server AS on the access controller AC is "True" indicating that the access controller AC is legal; and the authentication result of the authentication server AS on the requester REQ is "Failure" indicating that the identity of the requester REQ is illegal.

4.3.2) The authentication server AS constructs the identity authentication response message M4, i.e., $ID_{AC}||||N_{REQ}Res(AC)||||Res(REQ)$, and sends $ID_{AC}||||N_{REQ}||||Res(AC)||||Res(REQ)$ to the requester REQ. At this time, the authentication result of the authentication server AS on the access controller AC is "True" indicating that the access controller AC is legal; and the authentication result of the authentication server AS on the requester REQ is "True" indicating that the identity of the requester REQ is legal.

In another embodiment, the identity authentication response message M4 is a message including at least $ID_{AC}||||N_{REQ}||||Res(AC)||||Res(REQ)$.

Preferably, a particular embodiment of the step S5 is as follows:

5.1) After receiving the identity authentication response message M4, i.e., $ID_{AC}||||N_{REQ}||||Res(AC)||||Res(REQ)$, of the authentication server AS, the requester REQ firstly determines whether the random number $N_{REQ}$ is the random number generated by the requester REQ, and if not so, then performs 5.2); otherwise, performs 5.3).

5.2) The requester REQ discards the identity authentication response message M4.

5.3) If Res(AC) is the result after the cipher code operation, then the requester REQ performs a cipher code operation on Res(AC) using the authentication information shared with the authentication server AS, which operation is an inverse operation of the cipher code operation used to generate Res(AC), and thus obtains the authentication result of the authentication server AS on the access controller AC. If Res(AC) is the result without the cipher code operation, then the authentication result of the authentication server AS on the access controller AC is obtained directly, and if the authentication result is "Failure" indicating that the access controller AC is illegal, then performs the step 5.3.1); or if it is "True" indicating that the access controller AC is legal, then performs 5.3.2).

5.3.1) The requester REQ terminates the access.

5.3.2) The requester REQ regenerates a random number $N'_{REQ}$, and constructs the access authentication response message M5, i.e., $N_{AC}||||N'_{REQ}||||Res(REQ)$, and sends $N_{AC}||||N'_{REQ}||||Res(REQ)$ to the access controller AC.

In another embodiment, the access authentication response message M5 is a message including at least $N_{AC}||||N'_{REQ}||||Res(REQ)$.

Preferably, a particular embodiment of the step S6 is as follows:

6.1) After receiving the access authentication response message M5, i.e., $N_{AC}||||N'_{REQ}||||Res(REQ)$, of the requester REQ, the access controller AC firstly determines whether the random number $N_{AC}$ is the random number $N_{AC}$ generated by the access controller AC, and if not so, then performs 6.2); otherwise, performs 6.3).

6.2) The access controller AC rejects the access of the requester REQ.

6.3) If Res(REQ) is the result after the cipher code operation, then the access controller AC performs a cipher code operation on Res(REQ) using the authentication information shared with the authentication server AS, which operation is an inverse operation of the cipher code operation used to generate Res(REQ), and thus obtains the authentication result of the authentication server AS on the requester REQ. If Res(REQ) is the result without the cipher code operation, then the authentication result of the authentication server AS on the requester REQ is obtained directly, and if the authentication result is "Failure" indicating that the requester REQ is illegal, then performs 6.3.1); or if it is "True" indicating that the requester REQ is legal, then performs 6.3.2).

6.3.1) The access controller AC rejects the access of the requester REQ.

6.3.2) The access controller AC determines whether the access request $Q_{REQ}$ sent in the step S1 from the requester REQ is legal according to the authorization policy, and if it is determined that the access request $Q_{REQ}$ sent in the step S1 from the requester REQ is illegal, then performs 6.3.2.1); or if it is determined that the access request $Q_{REQ}$ sent in the step S1 from the requester REQ is legal, then performs 6.3.2.2).

6.3.2.1) The access controller AC rejects the access of the requester REQ.

6.3.2.2) The access controller AC constructs response data $R_{AC}$ according to $Q_{REQ}$, and constructs the access response message M6, i.e., $N'_{REQ}||||R_{AC}$, and sends $N'_{REQ}||||R_{AC}$ to the requester REQ, wherein the response data $R_{AC}$ is used for the access controller AC to notify the requester REQ whether to be authorized to access the destination network.

Wherein the authorization policy of the access controller AC on the requester REQ can be local or provided by another server, and when the authorization policy is provided by the authentication server AS, then the identity authentication response message M4 in the step S4 needs to be modified to $ID_{AC}||||N_{REQ}Res(AC)||||Res(REQ)||||AP_{AS}$, wherein $AP_{AS}$ represents the authorization policy on the requester REQ; and also the access authentication response message M5 in the step S5 needs to be modified to $N_{AC}||||N'_{REQ}||||Res(REQ)||||AP_{AS}$.

At this point, the authentication and authorization of the access controller AC on the requester REQ have been accomplished to thereby achieve the access control for the access controller AC.

After receiving the access response message M6, the requester REQ firstly determines whether the random number $N'_{REQ}$ is the random number $N'_{REQ}$ generated by the requester REQ, and if not so, then discards the access response message M6; otherwise, then determines whether to be authorized by the access controller AC to access the destination network according to the response data $R_{AC}$ and hereby accesses the destination network.

In another embodiment, the access response message M6 is a message including at least $N'_{REQ}||||R_{AC}$.

Second Embodiment

Step S1

The requester REQ constructs $N_{REQ}||||Q_{REQ}$ and sends $N_{REQ}||||Q_{REQ}$ to the access controller AC, and in this embodiment, $N_{REQ}||||Q_{REQ}$ is the access request message M1, whereas in another embodiment, the request message M1 can alternatively be another message, and the another message includes at least $N_{REQ}||||Q_{REQ}$, wherein "||||" represents concatenation of two consecutive pieces of information both here and hereinafter.

Step S2

The access controller AC constructs the access authentication request message M2, i.e., $N_{REQ}||||N_{AC}||||E(K_{AS,AC}, N_{REQ})$, and sends $N_{REQ}||||N_{AC}||||E(K_{AS,AC}, N_{REQ})$ to the requester REQ after receiving the access request message M1, i.e., $_{NREQ}||||Q_{REQ}$, and in another embodiment, the access authentication request message M2 is a message including at least $N_{REQ}||||N_{AC}||||E(K_{AS,AC}, N_{REQ})$.

Wherein $N_{AC}$ represents a random number generated by the access controller AC; $E(K_{AS,AC}, N_{REQ})$ represents a result of encrypting $N_{REQ}$ using a shared key $K_{AS,AC}$, i.e., the identity authentication information I1 of the access controller AC; and E represents a symmetric algorithm, both here and hereinafter.

Step S3

After receiving the access authentication request message M2, i.e., $N_{REQ}||||N_{AC}||||E(K_{AS,AC}, N_{REQ})$, the requester REQ firstly determines whether $N_{REQ}$ is the random number generated by the requester REQ, and if not so, then discards the authentication request message M2; otherwise, the requester REQ calculates $E(K_{AS,REQ}, N_{REQ})$ using a shared key $K_{AS,REQ}$, i.e., the identity authentication information I2 of the requester REQ, and constructs the identity authentication request message M3, i.e., $ID_{AC}||||N_{REQ}||||E(K_{AS,REQ}, N_{REQ})||||E(K_{AS,AC}, N_{REQ})$, and sends $ID_{AC}||||N_{REQ}||||E(K_{AS,REQ}, N_{REQ})||||E(K_{AS,AC}, N_{REQ})$ to the authentication server AS, wherein $ID_{AC}$ represents an identity identifier of the access controller AC both here and hereinafter.

In another embodiment, the identity authentication request message M3 is a message including at least $ID_{AC}||||N_{REQ}||||E(K_{AS,REQ}, N_{REQ})||||E(K_{AS,AC}, N_{REQ})$.

Step S4

4.1) After receiving the identity authentication request message M3, i.e., $ID_{AC}||||N_{REQ}||||E(K_{AS,REQ}, N_{REQ})||||E(K_{AS,AC}, N_{REQ})$, the authentication server AS firstly determines whether the requester REQ has shared the key $K_{AS,REQ}$ with the authentication server AS, and if the key $K_{AS,REQ}$ is not shared, then performs 4.2); or if the key $K_{AS,REQ}$ has been shared, then performs 4.3).

4.2) The authentication server AS determines whether the access controller AC has shared the key $K_{AS,AC}$ with the authentication server AS according to $ID_{AC}$, and if the key $K_{AS,AC}$ is not shared, then performs 4.2.1); or if the key $K_{AS,AC}$ has been shared, then performs 4.2.2).

4.2.1) The authentication server AS terminates authentication.

4.2.2) The authentication server AS decrypts $E(K_{AS,AC}, N_{REQ})$, i.e., the identity authentication information I1, using the shared key $K_{AS,AC}$, and determines whether $N_{REQ}$ obtained after decryption is equal to the information $N_{REQ}$ in the identity authentication request message M3 sent in the step S3 from the requester REQ to the authentication server AS, and if $N_{REQ}$ obtained after decryption is not equal to the information $N_{REQ}$ in the identity authentication request message M3 sent in the step S3 from the requester REQ to the authentication server AS, then performs 4.2.2.1); or if $N_{REQ}$ obtained after decryption is equal to the information $N_{REQ}$ in the identity authentication request message M3 sent in the step S3 from the requester REQ to the authentication server AS, then performs 4.2.2.2).

4.2.2.1) The authentication server AS terminates authentication.

4.2.2.2) The authentication server AS constructs the identity authentication response message M4, i.e., $ID_{AC}||||N_{REQ}||||Res(AC)||||Res(REQ)||||MIC_2$, and sends $ID_{AC}||||N_{REQ}||||Res(AC)||||Res(REQ)||||MIC_2$ to the requester REQ, wherein Res(AC) is the authentication result C1 that can be disclosed, Res(REQ) is the authentication result C2 that can be disclosed, $Res(AC)=E(K_{AS,REQ}, R(AC))$, $Res(REQ)=E(K_{AS,AC}, R(REQ))$, R(AC) is the first authentication result, R(REQ) is the second authentication result, and $MIC_2$ represents a message integrity authentication code, both here and hereinafter; and at this time, R(AC)=True, indicating that the identity of the access controller AC is legal, and R(REQ)=Failure, indicating that the identity of the requester REQ is illegal; and at this time, $MIC_2=H(K_{AS,REQ}, ID_{AC}||||N_{REQ}||||Res(AC)||||Res(REQ))$, used to verify the message $ID_{AC}||||N_{REQ}||||Res(AC)||||Res(REQ)$ for integrity.

4.3) The authentication server AS decrypts $E(K_{AS,REQ}, N_{REQ})$ using the shared key $K_{AS,REQ}$ and determines whether $N_{REQ}$ obtained after decryption is equal to the information $N_{REQ}$ in the identity authentication request message M3 sent in the step S3 from the requester REQ to the authentication server AS, and if $N_{REQ}$ obtained after decryption is not equal to the information $N_{REQ}$ in the identity authentication request message M3 sent in the step S3 from the requester REQ to the authentication server AS, then performs 4.3.1); or if $N_{REQ}$ obtained after the authentication server AS decrypts $E(K_{AS,REQ}, N_{REQ})$ using the shared key $K_{AS,REQ}$ is equal to the information $N_{REQ}$ in the identity authentication request message M3 sent in the step S3 from the requester REQ to the authentication server AS, then performs 4.3.2).

4.3.1) The authentication server AS determines whether the access controller AC has shared the key $K_{AS,AC}$ with the authentication server AS according to $ID_{AC}$, and if the key $K_{AS,AC}$ is not shared, then performs 4.3.1.1); or if the key $K_{AS,AC}$ has been shared, then performs 4.3.1.2).

4.3.1.1) The authentication server AS terminates authentication.

4.3.1.2) The authentication server AS decrypts $E(K_{AS,AC}, N_{REQ})$ using the shared key $K_{AS,AC}$ and determines whether $N_{REQ}$ obtained after decryption is equal to the information $N_{REQ}$ in the identity authentication request message M3 sent in the step S3 from the requester REQ to the authentication server AS, and if $N_{REQ}$ obtained after decryption is not equal to the information $N_{REQ}$ in the identity authentication request message M3 sent in the step S3 from the requester REQ to the authentication server AS, then performs 4.3.1.2.1); or if $N_{REQ}$ obtained after decryption is equal to the information $N_{REQ}$ in the identity authentication request message M3 sent in the step S3 from the requester REQ to the authentication server AS, then performs 4.3.1.2.2).

4.3.1.2.1) The authentication server AS terminates authentication.

4.3.1.2.2) The authentication server AS constructs the identity authentication response message M4, i.e., $ID_{AC}||||N_{REQ}||||Res(AC)||||Res(REQ)||||MIC_2$, and sends $ID_{AC}||N_{REQ}||Res(AC)||Res(REQ)||MIC_2$ to the requester REQ. At this time, R(AC)=True, indicating that the authentication server AS authenticates the access controller AC with success, and R(REQ)=Failure, indicating that the authentication server AS authenticates the requester REQ with failure; and at this time, $MIC_2=H(K_{AS,REQ}, ID_{AC}||N_{REQ}||Res(AC)||Res(REQ))$, used to verify the message $ID_{AC}||N_{REQ}||Res(AC)||Res(REQ)$ for integrity, wherein H represents a unidirectional hash algorithm both here and hereinafter.

4.3.2) The authentication server AS determines whether the access controller AC has shared the key $K_{AS,AC}$ with the authentication server AS according to $ID_{AC}$, and if the key $K_{AS,AC}$ is not shared, then performs 4.3.2.1); or if the key $K_{AS,AC}$ has been shared, then performs 4.3.2.2).

4.3.2.1) The authentication server AS constructs the identity authentication response message M4, i.e., $ID_{AC}||N_{REQ}||Res(AC)||Res(REQ)||MIC_2$, and sends $ID_{AC}||N_{REQ}||Res(AC)||Res(REQ)||MIC_2$ to the requester REQ. At this time, R(AC)=Failure, indicating that the authentication server AS authenticates the access controller AC with failure, and R(REQ)=True, indicating that the authentication server AS authenticates the requester REQ with success. At this time, $MIC_2=H(K_{AS,REQ}, ID_{AC}||N_{REQ}||Res(AC)||Res(REQ))$, used to verify the message $ID_{AC}||N_{REQ}||Res(AC)||Res(REQ)$ for integrity.

4.3.2.2) The authentication server AS determines whether $N_{REQ}$ obtained after decrypting $E(K_{AS,AC}, N_{REQ})$ using the shared key $K_{AS,AC}$ is equal to the information $N_{REQ}$ in the identity authentication request message M3 sent in the step S3 from the requester REQ to the authentication server AS, and if not so, then performs the step 4.3.2.1); otherwise, performs 4.3.2.3).

4.3.2.3) The authentication server AS generates a session key $K_{AC,REQ}$ between the requester REQ and the access controller AC, then calculates $E(K_{AS,AC}, ID_{REQ}||K_{AC,REQ})$ and $E(K_{AS,REQ}, K_{AC,REQ})$ using the shared keys $K_{AS,AC}$ and $K_{AS,REQ}$ and the session key $K_{AC,REQ}$, and further calculates the message integrity authentication code at this time $MIC_2=H(K_{AS,REQ}, ID_{AC}||N_{REQ}||Res(AC)||Res(REQ)||E(K_{AS,AC}, ID_{REQ}||K_{AC,REQ})||E(K_{AS,REQ}, K_{AC,REQ}))$, wherein $ID_{REQ}$ is an identity identifier of the requester REQ both here and hereinafter. The message integrity authentication code $MIC_2$ at this time is used to verify the message $ID_{AC}||N_{REQ}||Res(AC)||Res(REQ)||E(K_{AS,AC}, ID_{REQ}||K_{AC,REQ})||E(K_{AS,REQ}, K_{AC,REQ})$ for integrity. At this time, R(AC)=True, indicating that the authentication server AS authenticates the access controller AC with success; and R(REQ)=True, indicating that the authentication server AS authenticates the requester REQ with success. The authentication server AS further constructs the identity authentication response message M4, i.e., $ID_{AC}||N_{REQ}||Res(AC)||Res(REQ)||E(K_{AS,AC}, ID_{REQ}||K_{AC,REQ})||E(K_{AS,REQ}, K_{AC,REQ})||MIC_2$ at this time, and sends $ID_{AC}||N_{REQ}||Res(AC)||Res(REQ)||E(K_{AS,AC}, ID_{REQ}||K_{AC,REQ})||E(K_{AS,REQ}, K_{AC,REQ})||MIC_2$ to the requester REQ.

In summary, it can be noted that when R(AC)=Failure or R(REQ)=Failure, the message integrity authentication code $MIC_2=H(K_{AS,REQ}, ID_{AC}||N_{REQ}||Res(AC)||Res(REQ))$, and correspondingly the identity authentication response message M4 is $ID_{AC}||N_{REQ}||Res(AC) Res(REQ)||MIC_2$, and moreover in another embodiment, the identity authentication response message M4 is a message including at least $ID_{AC}||N_{REQ}||Res(AC)||Res(REQ)||MIC_2$; and when R(AC)=True and R(REQ)=True, the message integrity authentication code $MIC_2=H(K_{AS,REQ}, ID_{AC}||N_{REQ}||Res(AC)||Res(REQ)||E(K_{AS,AC}, ID_{REQ}||K_{AC,REQ})||E(K_{AS,REQ}, K_{AC,REQ}))$, and correspondingly the identity authentication response message M4 is $ID_{AC}||N_{REQ}||Res(AC)||Res(REQ)||E(K_{AS,AC}, ID_{REQ}||K_{AC,REQ})||E(K_{AS,REQ}, K_{AC,REQ})||MIC_2$, and moreover in another embodiment, the identity authentication response message M4 is a message including at least $ID_{AC}||N_{REQ}||Res(AC)||Res(REQ)||E(K_{AS,AC}, ID_{REQ}||K_{AC,REQ})||E(K_{AS,REQ}, K_{AC,REQ})||MIC_2$.

Step S5

5.1) After receiving the identity authentication response message M4, i.e., $ID_{AC}||N_{REQ}||Res(AC)||Res(REQ)||MIC_2$ or $ID_{AC}||N_{REQ}||Res(REQ)||E(K_{AS,AC}, ID_{REQ}||K_{AC,REQ})||E(K_{AS,REQ}, K_{AC,REQ})||MIC_2$, the requester REQ firstly determines whether the random number $N_{REQ}$ is the random number generated by the requester REQ, and if not so, then performs 5.2); otherwise, performs 5.3).

Step 5.2) The requester REQ discards the identity authentication response message M4.

Step 5.3) The requester REQ determines integrity of the corresponding message according to $MIC_2$, and if there is no integrity, then performs 5.3.1); or if there is integrity, then performs 5.3.2).

5.3.1) The requester REQ discards the identity authentication response message M4.

5.3.2) The requester REQ decrypts the authentication result C1 that can be disclosed, i.e., Res(AC), using $K_{AS,REQ}$ to thereby determine legality of the access controller AC, and if R(AC) obtained after decrypting Res(AC) is R(AC)=Failure, indicating that the access controller AC is illegal, then performs 5.3.2.1); or if R(AC) obtained after decrypting Res(AC) is R(AC)=True, indicating that the access controller AC is legal, then performs 5.3.2.2).

5.3.2.1) The requester REQ terminates the access.

5.3.2.2) The requester REQ decrypts $E(K_{AS,REQ}, K_{AC,REQ})$ in the identity authentication response message M4 to obtain the session key $K_{AC,REQ}$, and generates a random number $N'_{REQ}$, calculates a message integrity authentication code $MIC_3=H(K_{AC,REQ}, N_{AC}||N'_{REQ}||Res(REQ)||E(K_{AS,AC}, ID_{REQ}||K_{AC,REQ}))$, constructs the access authentication response message M5, i.e., $N_{AC}||N'_{REQ}||Res(REQ)||E(K_{AS,AC}, ID_{REQ}||K_{AC,REQ})||MIC_3$, and sends $N_{AC}||N'_{REQ}||Res(REQ)||E(K_{AS,AC}, ID^{REQ}||K_{AC,REQ})||MIC_3$ to the access controller AC, wherein the message integrity authentication code $MIC_3$ is used to verify the message $N_{AC}||N'_{REQ}||Res(REQ)||E(K_{AS,AC}, ID_{REQ}||K_{AC,REQ})$ for integrity.

In another embodiment, the access authentication response message M5 is a message including at least $N_{AC}||N'_{REQ}||Res(REQ)||E(K_{AS,AC}, ID_{REQ}||K_{AC,REQ})||MIC_3$.

Step S6

6.1) After receiving the access authentication response message M5, i.e., $N_{AC}||N'_{REQ}||Res(REQ)||E(K_{AS,AC}, ID_{REQ}||K_{AC,REQ})||MIC_3$, the access controller AC firstly determines whether the random number $N_{AC}$ is the random number generated by the access controller AC, and if not so, then performs 6.2); otherwise, performs 6.3).

6.2) The access controller AC rejects the access of the requester REQ.

6.3) The access controller AC decrypts Res(REQ) using $K_{AS,AC}$, and if R(REQ) obtained after decrypting Res(REQ) is R(REQ)=Failure, indicating that the requester REQ is illegal, then performs 6.3.1); or if R(REQ) obtained after decrypting Res(REQ) is R(REQ)=True, indicating that the requester REQ is legal, then performs 6.3.2).

6.3.1) The access controller AC rejects the access of the requester REQ.

6.3.2) The access controller AC decrypts $E(K_{AS,AC}, ID_{REQ}||K_{AC,REQ})$ to obtain the session key $K_{AC,REQ}$, and determines integrity of the message $N_{AC}|||N'_{REQ}|||Res(REQ)||||E(K_{AS,AC}, ID_{REQ}|||K_{AC,REQ})$ according to $MIC_3$, and if there is no integrity, then performs 6.3.2.1); or if there is integrity, then performs 6.3.2.2).

6.3.2.1) The access controller AC rejects the access of the requester REQ.

6.3.2.2) The access controller AC determines whether $ID_{REQ}$ obtained after decrypting $E(K_{AS,AC}, ID_{REQ}|||K_{AC,REQ})$ is consistent with the identity identifier $ID_{REQ}$ of the requester REQ, and if there is no consistency, then performs 6.3.2.2.1); or if there is consistency, then performs 6.3.2.2.2).

6.3.2.2.1) The access controller AC rejects the access of the requester REQ.

6.3.2.2.2) The access controller AC determines whether the access request $Q_{REQ}$ sent in the step S1 from the requester REQ is legal according to the authorization policy, and if there is no legality, then performs 6.3.2.2.2.1); or if there is legality, then performs 6.3.2.2.2.2).

6.3.2.2.2.1) The access controller AC rejects the access of the requester REQ.

6.3.2.2.2.2) The access controller AC constructs response data $R_{AC}$ according to $Q_{REQ}$, calculates a message integrity authentication code $MIC_4=H(K_{AC,REQ}, N'_{REQ}|||E(K_{AC,REQ}, R_{AC}))$ and further constructs the access response message M6, i.e., $N'_{REQ}|||E(K_{AC,REQ}, R_{AC})||||MIC_4$, and sends $N'_{REQ}|||E(K_{AC,REQ}, R_{AC})||||MIC_4$ to the requester REQ, wherein $R_{AC}$ is used for the access controller AC to notify the requester REQ whether to be authorized to access the destination network.

Wherein the message integrity authentication code $MIC_4$ is used to verify the message $N'_{REQ}|||E(K_{AC,REQ}, R_{AC})$ for integrity, and the authorization policy of the access controller AC on the requester REQ can be from the access controller AC locally or provided by another server, e.g., the authentication serer AS, and when the authorization policy is provided by the authentication server AS, then $E(K_{AS,AC}, ID_{REQ}|||K_{AC,REQ})$ in the identity authentication response message M4, i.e., $ID_{AC}|||N_{REQ}|||Res(AC)||||Res(REQ)||||E(K_{AS,AC}, ID_{REQ}|||K_{AC,REQ})||||E(K_{AS,REQ}, K_{AC,REQ})||||MIC_2$, in the step S4 needs to be modified to $E(K_{AS,AC}, ID_{REQ}|||K_{AC,REQ}||||AP_{AS})$; and also $E(K_{AS,AC}, ID_{REQ}|||K_{AC,REQ})$ in the access authentication response message M5, i.e., $N_{AC}|||N'_{REQ}|||E(K_{AS,AC}, ID_{REQ}|||K_{AC,REQ})||||MIC_3$, in the step S5 needs to be modified to $E(K_{AS,AC}, ID_{REQ}|||K_{AC,REQ}||||AP_{AS})$, wherein $AP_{AS}$ represents the authorization policy on the requester REQ.

At this point, the authentication and authorization of the access controller AC on the requester REQ have been accomplished to thereby achieve the access control for the access controller AC.

6.4) After receiving the access response message M6, i.e., $N'_{REQ}|||E(K_{AC,REQ}, R_{AC})||||MIC_4$, the requester REQ firstly determines whether the random number $N'_{REQ}$ is the random number generated by the requester REQ, and if not so, then performs 6.4.1); otherwise, performs 6.4.2).

6.4.1) The requester REQ discards the access response message M6.

6.4.2) The requester REQ determines integrity of the message $N'_{REQ}|||E(K_{AC,REQ}, R_{AC})$ according to $MIC_4$, and if there is no integrity, then performs 6.4.2.1); or if there is integrity, then performs 6.4.2.2).

6.4.2.1) The requester REQ discards the access response message M6.

6.4.2.2) The requester REQ decrypts $E(K_{AC,REQ}, R_{AC})$ to obtain the response data $R_{AC}$ and determines whether to be authorized by the access controller AC to access the destination network according to the response data $R_{AC}$ and then hereby accesses the destination network.

In another embodiment, the access response message M6 is a message including at least $N'_{REQ}|||E(K_{AC,REQ}, R_{AC})||||MIC_4$.

Another particular embodiment of the steps S2 to S4 in the foregoing second embodiment is as follows:

Step S2

The access controller AC constructs the access authentication request message M2, i.e., $N_{REQ}|||N_{AC}|||H(K_{AS,AC}|||N_{REQ})$, and sends $N_{REQ}|||N_{AC}|||H(K_{AS,AC}|||N_{REQ})$ to the requester REQ after receiving the access request message M1, i.e., $N_{REQ}|||Q_{REQ}$, and in another embodiment, the access authentication request message M2 is a message including at least $N_{REQ}|||N_{AC}|||H(K_{AS,AC}|||_{REQ})$.

Wherein $H(K_{AS,AC}|||N_{REQ})$ represents a result of a hash operation on $K_{AS,AC}|||N_{REQ}$, i.e., the identity authentication information I1 of the access controller AC.

Step S3

After receiving the access authentication request message M2, i.e., $N_{REQ}|||N_{AC}|||H(K_{AS,AC}|||N_{REQ})$, the requester REQ firstly determines whether $N_{REQ}$ is the random number generated by the requester REQ, and if not so, then discards the authentication request message M2; otherwise, the requester REQ calculates a message integrity authentication code $MIC_5=H(K_{AS,REQ}, ID_{AC}|||N_{REQ}|||H(K_{AS,AC}|||N_{REQ}))$ using a shared key $K_{AS,REQ}$ and further constructs the identity authentication request message M3, i.e., $ID_{AC}|||N_{REQ}|||H(K_{AS,AC}|||N_{REQ})||||MIC_5$ and sends $ID_{AC}|||N_{REQ}|||H(K_{AS,AC}|||N_{REQ})||||MIC_5$ to the authentication server AS, wherein the message integrity authentication code $MIC_5$ is used to verify $ID_{AC}|||N_{REQ}|||H(K_{AS,AC}|||N_{REQ})$ for integrity, that is, $MIC_5$ is the identity authentication information I2 of the requester REQ.

In another embodiment, the identity authentication request message M3 is a message including at least $ID_{AC}|||N_{REQ}|||H(K_{AS,AC}|||N_{REQ})||||MIC_5$.

Step S4

4.1') After receiving the identity authentication request message M3, i.e., $ID_{AC}|||N_{REQ}|||H(K_{AS,AC}|||N_{REQ})||||MIC_5$ the authentication server AS firstly determines whether the requester REQ has shared the key $K_{AS,REQ}$ with the authentication server AS, and if the key $K_{AS,REQ}$ is not shared, then performs 4.2'); or if the key $K_{AS,REQ}$ has been shared, then performs 4.3').

4.2') The authentication server AS determines whether the access controller AC has shared the key $K_{AS,AC}$ with the authentication server AS according to $ID_{AC}$, and if the key $K_{AS,AC}$ is not shared, then performs 4.2.1'); or if the key $K_{AS,AC}$ has been shared, then performs 4.2.2').

4.2.1') The authentication server AS terminates authentication.

4.2.2') The authentication server AS constructs the identity authentication response message M4, i.e., $ID_{AC}|||N_{REQ}|||Res(AC)||||Res(REQ)||||MIC_2$, and sends $ID_{AC}|||N_{REQ}|||Res(AC)||||Res(REQ)||||MIC_2$ to the requester REQ, wherein Res(AC) is the authentication result C1 that can be disclosed, Res(REQ) is the authentication result C2 that can be disclosed, $Res(AC)=E(K_{AS,REQ}, R(AC))$, $Res(REQ)=E(K_{AS,AC}, R(REQ))$, R(AC) is the first authentication result, R(REQ) is the second authentication result, and $MIC_2$ is a message integrity authentication code. At this time, R(REQ)=Failure, indicating that the authentication server AS authenticates the requester REQ with failure, and R(AC)=True, indicating that the authentication server AS authenticates the access controller AC with success. At this time, $MIC_2=H(K_{AS,REQ}, ID_{AC}|||N_{REQ}|||Res(AC)||||Res(REQ))$, used to verify the message $ID_{AC}|||N_{REQ}|||Res(AC)||||Res(REQ)$ for integrity.

4.3') The authentication server AS determines integrity of $ID_{AC}|||N_{REQ}|||H(K_{AS,AC}|||N_{REQ})$ according to $MIC_5$ in the identity authentication request message M3, and if there is no integrity, then performs 4.3.1'); of if there is integrity, which indicates that the requester REQ is legal, then performs 4.3.2').

4.3.1') The authentication server AS discards the identity authentication request message M3.

4.3.2') The authentication server AS determines whether the access controller AC has shared the key $K_{AS,AC}$ with the authentication server AS according to $ID_{AC}$, and if the key $K_{AS,AC}$ is not shared, then performs 4.3.2.1'); or if the key $K_{AS,AC}$ has been shared, then performs 4.3.2.2').

4.3.2.1') The authentication server AS constructs the identity authentication response message M4, i.e., $ID_{AC}\|\|N_{REQ}\|\|Res(AC)\|\|Res(REQ)\|\|MIC_2$, and sends $ID_{AC}\|\|N_{REQ}\|\|Res(AC)\|\|Res(REQ)\|\|MIC_2$ to the requester REQ. At this time, R(AC)=Failure, indicating that the authentication server AS authenticates the access controller AC with failure, and R(REQ)=True, indicating that the authentication server AS authenticates the requester REQ with success. At this time, $MIC_2=H(K_{AS,REQ}, ID_{AC}\|\|N_{REQ}\|\|Res(AC)\|\|Res(REQ))$, used to verify the message $ID_{AC}\|\|N_{REQ}\|\|Res(AC)\|\|Res(REQ)$ for integrity.

4.3.2.2') The authentication server AS verifies $H(K_{AS,AC}\|\|N_{REQ})$ for integrity according to $N_{REQ}$, and if there is verification with failure, then performs 4.3.2.2.1'); or if there is verification with success, then performs 4.3.2.2.2').

4.3.2.2.1') The authentication server AS constructs the identity authentication response message M4, i.e., $ID_{AC}\|\|N_{REQ}\|\|Res(AC)\|\|Res(REQ)\|\|MIC_2$, and sends $ID_{AC}\|\|N_{REQ}\|\|Res(AC)\|\|Res(REQ)\|\|MIC_2$ to the requester REQ. At this time, R(AC)=Failure, indicating that the authentication server AS authenticates the access controller AC with failure, and R(REQ)=True, indicating that the authentication server AS authenticates the requester REQ with success. At this time, $MIC_2=H(K_{AS,REQ}, ID_{AC}\|\|N_{REQ}\|\|Res(AC)\|\|Res(REQ))$, used to verify the message $ID_{AC}\|\|N_{REQ}\|\|Res(AC)\|\|Res(REQ)$ for integrity.

4.3.2.2.2') The authentication server AS generates a session key $K_{AC,REQ}$ between the requester REQ and the access controller AC, then calculates $E(K_{AS,AC}, ID_{REQ}\|\|K_{AC,REQ})$ and $E(K_{AS,REQ}, K_{AC,REQ})$ using the shared keys $K_{AS,AC}$ and $K_{AS,REQ}$ and the session key $K_{AC,REQ}$ and further calculates the message integrity authentication code at this time $MIC_2=H(K_{AS,REQ}, ID_{AC}\|\|N_{REQ}\|\|Res(AC)\|\|Res(REQ)\|\|E(K_{AS,AC}, ID_{REQ}\|\|K_{AC,REQ})\|\|E(K_{AS,REQ}, K_{AC,REQ}))$ used to verify the message $ID_{AC}\|\|N_{REQ}\|\|Res(AC)\|\|Res(REQ)\|\|E(K_{AS,AC}, ID_{REQ}\|\|K_{AC,REQ})\|\|E(K_{AS,REQ}, K_{AC,REQ})$ for integrity. At this time, R(AC)=True, indicating that the authentication server AS authenticates the access controller AC with success; and R(REQ)=True, indicating that the authentication server AS authenticates the requester REQ with success. The authentication server AS further constructs the identity authentication response message M4, i.e., $ID_{AC}\|\|N_{REQ}\|\|Res(AC)\|\|Res(REQ)\|\|E(K_{AS,AC}, ID_{REQ}\|\|K_{AC,REQ})\|\|E(K_{AS,REQ}, K_{AC,REQ})MIC_2$, at this time and sends $ID_{AC}\|\|N_{REQ}\|\|Res(AC)\|\|Res(REQ)\|\|E(K_{AS,AC}, ID_{REQ}\|\|K_{AC,REQ})\|\|E(K_{AS,REQ}, K_{AC,REQ})\|\|MIC_2$ to the requester REQ.

In summary, it can be noted that when R(AC)=Failure or R(REQ)=Failure, the message integrity authentication code $MIC_2=H(K_{AS,REQ}, ID_{AC}\|\|N_{REQ}\|\|Res(AC)\|\|Res(REQ))$, and correspondingly the identity authentication response message M4 is $ID_{AC}\|\|N_{REQ}\|\|Res(AC)\|\|Res(REQ)\|\|MIC_2$, and moreover in another embodiment, the identity authentication response message M4 is a message including at least $ID_{AC}\|\|N_{REQ}\|\|Res(AC)\|\|Res(REQ)\|\|MIC_2$; and when R(AC)=True and R(REQ)=True, the message integrity authentication code $MIC_2=H(K_{AS,REQ}, ID_{AC}\|\|N_{REQ}\|\|Res(AC)\|\|Res(REQ)\|\|E(K_{AS,AC}, ID_{REQ}\|\|K_{AC,REQ})\|\|E(K_{AS,REQ}, K_{AC,REQ}))$, and correspondingly the identity authentication response message M4 is $ID_{AC}\|\|N_{REQ}\|\|Res(AC)\|\|Res(REQ)\|\|E(K_{AS,AC}, ID_{REQ}\|\|K_{AC,REQ})\|\|E(K_{AS,REQ}, K_{AC,REQ})\|\|MIC_2$, and moreover in another embodiment, the identity authentication response message M4 is a message including at least $ID_{AC}\|\|N_{REQ}\|\|Res(AC)\|\|Res(REQ)\|\|E(K_{AS,AC}, ID_{REQ}\|\|K_{AC,REQ})\|\|E(K_{AS,REQ}, K_{AC,REQ})\|\|MIC_2$.

Third Embodiment

Step S1

The requester REQ constructs $N_{REQ}\|\|I_{REQ}\|\|Q_{REQ}$ and sends $N_{REQ}\|\|I_{REQ}\|\|Q_{REQ}$ to the access controller AC, and in this embodiment, $N_{REQ}\|\|I_{REQ}\|\|Q_{REQ}$ is the access request message M1, whereas in another embodiment, the request message M1 can alternatively be another message, and the another message includes at least $N_{REQ}\|\|I_{REQ}\|\|Q_{REQ}$.

Wherein $I_{REQ}$ represents identity authentication information of the requester REQ, i.e., the identity authentication information I2, used to testify identity legality of the requester REQ to the authentication server AS, $N_{REQ}$ represents a random number generated by the requester REQ, and "$\|$" represents concatenation of two consecutive pieces of information, both here and hereinafter.

Step S2

The access controller AC constructs the access authentication request message M2, i.e., $N_{REQ}\|\|N_{AC}\|\|I_{REQ}\|\|I_{AC}\|\|S_{AC}(N_{REQ}\|\|N_{AC}\|\|I_{REQ})$, and sends $N_{REQ}\|\|N_{AC}\|\|I_{REQ}\|\|I_{AC}\|\|S_{AC}(N_{REQ}\|\|N_{AC}\|\|I_{REQ})$ to the requester REQ after receiving the access request message M1, i.e., $N_{REQ}\|\|I_{REQ}\|\|Q_{REQ}$, and in another embodiment, the access authentication request message M2 is a message including at least $N_{REQ}\|\|N_{AC}\|\|I_{REQ}\|\|I_{AC}\|\|S_{AC}(N_{REQ}\|\|N_{AC}\|\|I_{REQ})$.

Wherein $N_{AC}$ represents a random number generated by the access controller AC, $I_{AC}$ represents identity authentication information of the access controller AC, i.e., the identity authentication information I1, used to testify identity legality of the access controller AC to the authentication server AS, and $S_{AC}(N_{REQ}\|\|N_{AC}\|\|I_{REQ})$ represents a signature of the access controller AC on $N_{REQ}\|\|N_{AC}\|\|I_{REQ}$, i.e., a digital signature SIG1.

Step S3

After receiving the access authentication request message M2, i.e., $N_{REQ}\|\|N_{AC}\|\|I_{REQ}\|\|I_{AC}\|\|S_{AC}(N_{REQ}\|\|N_{AC}\|\|I_{REQ})$, the requester REQ firstly determines whether $N_{REQ}$ is the random number generated by the requester REQ, and if not so, then discards the authentication request message M2; otherwise, constructs the identity authentication request message M3, i.e., $N'_{REQ}\|\|N_{AC}\|\|I_{REQ}\|\|I_{AC}$ and sends $N'_{REQ}\|\|N_{AC}\|\|I_{REQ}\|\|I_{AC}$ to the authentication server AS, wherein $N'_{REQ}$ represents a random number generated by the requester REQ both here and hereinafter.

In another embodiment, the identity authentication request message M3 is a message including at least $N'_{REQ}\|\|N_{AC}\|\|I_{REQ}\|\|I_{AC}$.

Step S4

After receiving the identity authentication request message M3, i.e., $N'_{REQ}\|\|N_{AC}\|\|I_{REQ}\|\|I_{AC}$, of the requester REQ, the authentication server AS verifies $I_{REQ}$ and $I_{AC}$, constructs the identity authentication response message M4, i.e., $Res(I_{REQ})\|\|Res(I_{AC}\|\|S_{AS}N'_{REQ}\|\|Res(I_{AC}))\|\|S_{AS}(N_{AC}\|\|Res(I_{REQ}))$, and sends $Res(I_{REQ})\|\|Res(I_{AC}\|\|S_{AS}N'_{REQ}\|\|Res(I_{AC}))\|\|S_{AS}N_{AC}\|\|Res(I_{REQ}))$ to the requester REQ.

Wherein $Res(I_{AC})$ is the authentication result C1 that can be disclosed, including a verification result of the authentication server AS on $I_{AC}$ and a public key of the access controller AC; $Res(I_{REQ})$ is the authentication result C2 that can be disclosed, including a verification result of the authentication server AS on $I_{REQ}$ and a public key of the requester REQ; and $S_{AS}(N'_{REQ}\|Res(I_{AC}))$ and $S_{AS}(N_{AC}\|Res(I_{REQ}))$ represent digital signatures of the authentication server AS on $N'_{REQ}\|Res(I_{AC})$ and $N_{AC}\|Res(I_{REQ})$ respectively.

In another embodiment, the identity authentication response message M4 is a message including at least $Res(I_{REQ})\|Res(I_{AC}\|S_{AS}(N'_{REQ}\|Res(I_{AC}))\|S_{AS}\|(N_{AC}\|Res(I_{REQ}))$.

Step S5

After receiving the identity authentication response message M4, i.e., $Res(I_{REQ})\|Res(I_{AC}\|S_{AS}(N'_{REQ}\|Res(I_{AC}))\|S_{AS}(N_{AC}\|Res(I_{REQ}))$, of the authentication server AS, the requester REQ firstly verifies the signature $S_{AS}(N'_{REQ}\|Res(I_{AC}))$ for validity using a public key of the authentication server AS, and if there is validity, then determines whether $N'_{REQ}$ is consistent with the random number $N'_{REQ}$ sent in the step S3 from the requester REQ to the authentication server AS, and if there is consistency, then the requester REQ determines whether the identity of the access controller AC is legal according to the authentication result $Res(I_{AC})$, i.e., the authentication result C1 that can be disclosed, and if there is legality, then obtains the public key of the access controller AC from $Res(I_{AC})$ and verifies the digital signature SIG1, i.e., $S_{AC}(N_{REQ}\|N_{AC}\|I_{REQ})$, sent in the step S2 from the access controller AC to the requester REQ for validity using the public key, and if there is validity, then the requester REQ constructs the access authentication response message M5, i.e., $Res(I_{REQ})\|S_{AS}(N_{AC}\|Res(I_{REQ}))\|S_{REQ}(N_{REQ}\|N_{AC}\|I_{AC})$ and sends $Res(I_{REQ})\|S_{AS}(N_{AC}\|Res(I_{REQ}))\|S_{REQ}(N_{REQ}\|N_{AC}\|I_{AC})$ to the access controller AC, wherein the message includes the authentication result C2 that can be disclosed, i.e., $Res(I_{REQ})$, and $S_{REQ}(N_{REQ}\|N_{AC}\|I_{AC})$ in the message represents a signature of the requester REQ on $N_{REQ}\|N_{AC}\|I_{AC}$, i.e., a digital signature SIG2.

The requester REQ will terminate the access under the following conditions:

1) The signature $S_{AS}(N'_{REQ}\|Res(I_{AC}))$ is verified to be invalid;
2) The signature $S_{AS}(N'_{REQ}\|Res(I_{AC}))$ is verified to be valid, but the random number $N'_{REQ}$ is determined to be inconsistent;
3) The signature $S_{AS}(N'_{REQ}\|Res(I_{AC}))$ is verified to be valid and the random number $N'_{REQ}$ is determined to be consistent, but the identity of the access controller AC is determined to be illegal; and
4) The signature $S_{AS}(N'_{REQ}\|Res(I_{AC}))$ is verified to be valid, the random number $N'_{REQ}$ is determined to be consistent, and the identity of the access controller AC is determined to be legal, but the signature $S_{AC}(N_{REQ}\|N_{AC}\|I_{REQ})$ is verified to be invalid.

In another embodiment, the access authentication response message M5 is a message including at least $Res(I_{REQ})\|S_{AS}(N_{AC}\|Res(I_{REQ}))\|S_{REQ}(N_{REQ}\|N_{AC}\|I_{AC})$.

Step S6

After receiving the access authentication response message M5, i.e., $Res(I_{REQ})\|S_{AS}(N_{AC}\|Res(I_{REQ}))\|S_{REQ}(N_{REQ}\|N_{AC}\|I_{AC})$, of the requester REQ, the access controller AC firstly verifies the signature $S_{AS}(N_{AC}\|Res(I_{REQ}))$ for validity using the public key of the authentication server AS, and if there is validity, then determines whether the requester REQ is legal according to $Res(I_{REQ})$, i.e., the authentication result C2 that can be disclosed, and if there is legality, then determines whether $N_{AC}$ is consistent with the random number $N_{AC}$ sent in the step S2 from the access controller AC, and if there is consistency, then the access controller AC obtains the public key of the requester REQ from $Res(I_{REQ})$ and verifies the signature $S_{REQ}(N_{REQ}\|N_{AC}\|I_{AC})$ for validity using the public key, and if there is validity, then the access controller AC determines whether $I_{AC}$ included in the signature $S_{REQ}(N_{REQ}\|N_{AC}\|I_{AC})$ is consistent with $I_{AC}$ sent in the step S2 from the access controller AC, and if there is consistency, then determines whether $N_{AC}$ in the signature $S_{REQ}(N_{REQ}\|N_{AC}\|I_{AC})$ is consistent with the random number $N_{AC}$ sent in the step S2 from the access controller AC, and if there is consistency, then the access controller AC determines whether the access request $Q_{REQ}$ sent in the step S1 from the requester REQ is legal according to the authorization policy, and if there is legality, then constructs response data according to $Q_{REQ}$, constructs the access response message M6 and sends the access response message M6 to the requester REQ, wherein the access response message M6 includes the response data sent to the requester REQ, and the response data is used to notify the requester REQ whether to be authorized to access the destination network. Hereby the access of the requester REQ to the destination network is controlled.

Wherein the authorization policy of the access controller AC on the requester REQ can be local or provided by another server, e.g., the authentication server AS, and when the authorization policy is provided by the authentication server AS, then the identity authentication response message M4, i.e., $Res(I_{REQ})\|Res(I_{AC})\|S_{AS}(N'_{REQ}\|Res(I_{AC}))\|S_{AS}(N_{AC}\|Res(I_{REQ}))$, in the step S4 needs to be modified to $Res(I_{REQ})\|Res(I_{AC}\|S_{AS}(N'_{REQ}\|Res(I_{AC}))\ \|S_{AS}(N_{AC}\|Res(I_{REQ})\|AP_{AS})$, wherein $AP_{AS}$ represents the authorization policy, and at this time, the access authentication response message M5, i.e., $Res(I_{REQ})\|S_{AS}(N_{AC}\|Res(I_{REQ}))\|S_{REQ}(N_{REQ}\|N_{AC}\|I_{AC})$, in the step S5 needs to be modified to $Res(I_{REQ})\|S_{AS}(N_{AC}\|Res(I_{REQ}))\|AP_{AS})\|S_{REQ}(N_{REQ}N_{AC}\|I_{AC})$ correspondingly.

The access controller AC will reject the access of the requester REQ under the following conditions:

1) The signature $S_{AS}(N_{AC}\|Res(I_{REQ}))$ is verified to be invalid;
2) The signature $S_{AS}(N_{AC}\|Res(I_{REQ}))$ is verified to be valid, but the requester REQ is determined to be illegal;
3) The signature $S_{AS}(N_{AC}\|Res(I_{REQ}))$ is verified to be valid and the requester REQ is determined to be legal, but the random number $N_{AC}$ is determined to be inconsistent;
4) The signature $S_{AS}(N_{AC}\|Res(I_{REQ}))$ is verified to be valid, the requester REQ is determined to be legal and the random number $N_{AC}$ is determined to be consistent, but the signature $S_{REQ}(N_{REQ}\|N_{AC}\|I_{AC})$ is verified to be invalid;
5) The signature $S_{AS}(N_{AC}\|Res(I_{REQ}))$ is verified to be valid, the requester REQ is determined to be legal, the random number $N_{AC}$ is determined to be consistent and the signature $S_{REQ}(N_{REQ}\|N_{AC}\|I_{AC})$ is verified to be valid, but $I_{AC}$ in the signature $S_{REQ}(N_{REQ}\|N_{AC}\|I_{AC})$ is determined to be not consistent with the identity information of the access controller AC;
6) The signature $S_{AS}(N_{AC}\|Res(I_{REQ}))$ is verified to be valid, the requester REQ is determined to be legal, the random number $N_{AC}$ is determined to be consistent, the signature $S_{REQ}(N_{REQ}\|N_{AC}\|I_{AC})$ is verified to be valid and $I_{AC}$ in the signature $S_{REQ}(N_{REQ}\|N_{AC}\|I_{AC})$ is determined to be consistent with the identity information of the access controller AC, but the random number $N_{AC}$ in the signature $S_{REQ}(N_{REQ}\|N_{AC}\|I_{AC})$ is determined to be inconsistent; and
7) The signature $S_{AS}(N_{AC}\|Res(I_{REQ}))$ is verified to be valid, the requester REQ is determined to be legal, the random number $N_{AC}$ is determined to be consistent, the signature $S_{REQ}(N_{REQ}\|N_{AC}\|I_{AC})$ is verified to be valid, $I_{AC}$ in the signature $S_{REQ}(N_{REQ}\|N_{AC}\|I_{AC})$ is determined to be consistent with the identity information of the access controller AC and the random number $N_{AC}$ in the signature $S_{REQ}$ ($N_{REQ}\|N_{AC}\|I_{AC}$) is determined to be consistent, but the access request $Q_{REQ}$ sent in the step S1 from the requester REQ is determined to be illegal.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described with reference to flow charts and/or block diagrams of the method, the device (system) and the computer program product according to the embodiments of the invention. It shall be appreciated that respective flows and/or blocks in the flow charts and/or the block diagrams and combinations of the flows and/or the blocks in the flow charts and/or the block diagrams can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow charts and/or the block(s) of the block diagrams.

These computer program instructions can also be stored into a computer readable memory capable of directing the computer or the other programmable data processing device to operate in a specific manner so that the instructions stored in the computer readable memory create manufactures including instruction means which perform the functions specified in the flow(s) of the flow charts and/or the block(s) of the block diagrams.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow charts and/or the block(s) of the block diagrams.

Although the preferred embodiments of the invention have been described, those skilled in the art can make additional modifications and variations to these embodiments once informed of the underlying inventive concept. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as these modifications and variations come into the scope of the claims appended to the invention and their equivalents.

The invention claimed is:

1. A method for network access control, comprising:
   step 1), sending, by a requester, an access request message to an access controller of a destination network, wherein the access request message comprises an access request of the requester;
   step 2), constructing, by the access controller, an access authentication request message comprising first identity authentication information and sending the access authentication request message to the requester after receiving the access request message, wherein the first identity authentication information is identity authentication information of the access controller;
   step 3), constructing, by the requester, an identity authentication request message and sending the identity authentication request message to an authentication server of the destination network after receiving the access authentication request message, wherein the identity authentication request message comprises the first identity authentication information and second identity authentication information, and the second identity authentication information is identity authentication information of the requester;
   step 4), generating, by the authentication server, a first authentication result after authentication on the access controller according to the first identity authentication information and generating a second authentication result after authentication on the requester according to the second identity authentication information, after receiving the identity authentication request message; and constructing, by the authentication server, an identity authentication response message and sending the identity authentication response message to the requester, wherein the identity authentication response message comprises the first authentication result and the second authentication result;
   step 5), constructing, by the requester, an access authentication response message according to the first authentication result and sending the access authentication response message to the access controller after receiving the identity authentication response message, wherein the access authentication response message comprises the second authentication result; and
   step 6), constructing, by the access controller, an access response message according to the second authentication result and an authorization policy and sending the access response message to the requester after receiving the access authentication response message, wherein the authorization policy is a policy for the access controller to authorize the access request.

2. The method according to claim 1, wherein in the step 4), the authentication server returns the identity authentication response message to the requester when determining the identity of the access controller is illegal after authenticating the first identity authentication information, wherein the identity authentication response message comprises the first authentication result that the identity of the access controller is illegal and the second authentication result that there is no authentication result of the requester.

3. The method according to claim 1, wherein in the step 4), when determining the identity of the access controller is legal after authenticating the first identity authentication information, the authentication server performs the following steps:
   authenticating further the second identity authentication information; and
   returning the identity authentication response message to the requester when determining the identity of the requester is illegal according to the second identity authentication information, wherein the identity authentication response message comprises the first authentication result that the identity of the access controller is legal and the second authentication result that the identity of the requester is illegal; or returning the identity authentication response message to the requester when determining the identity of the requester is legal according to the second identity authentication information, wherein the identity authentication response message comprises the first authentication result that the identity of the access controller is legal and the second authentication result that the identity of the requester is legal.

4. The method according to claim 1, wherein the step 5) particularly comprises:

terminating, by the requester, the access when receiving the first authentication result that the identity of the access controller is illegal returned from the authentication server; or sending, by the requester, the second authentication result to the access controller in the access authentication response message when receiving the first authentication result that the identity of the access controller is legal.

5. The method according to claim 1, wherein the step 6) particularly comprises:

after receiving the access authentication response message, constructing, by the access controller, an access response message rejecting the access of the requester and sending the access response message to the requester when the second authentication result indicates that the identity of the requester is illegal; or constructing, by the access controller, an access response message allowing the access of the requester according to an authorization policy and sending the access response message to the requester when the second authentication result indicates that the identity of the requester is legal.

6. The method according to claim 5, wherein when the second authentication result indicates that the identity of the requester is legal, the method further comprises:

determining, by the access controller, whether the access request sent from the requester is legal according to the authorization policy, and if the access request is legal, allowing the access of the requester; otherwise, rejecting the access of the requester.

7. The method according to claim 1, wherein the authorization policy is stored in the access controller or provided by the authentication server;

when the authorization policy is provided by the authentication server, the authentication server further returns the authorization policy to the requester together with the first authentication result and the second authentication result; and the requester further sends the authorization policy to the access controller in the access authentication response message.

8. An access apparatus comprising:

an access request interacting module configured to send an access request message to an access controller of a destination network and to receive an access authentication request message comprising first identity authentication information sent from the access controller, wherein the first identity authentication information is identity authentication information of the access controller;

an authentication request interacting module configured to send an identity authentication request message to an authentication server of the destination network, wherein the identity authentication request message comprises the first identity authentication information and second identity authentication information, and the second identity authentication information is identity authentication information of the requester; and to receive an identity authentication response message sent from the authentication server, wherein the identity authentication response message comprises a first authentication result after identity authentication on the access controller according to the first identity authentication information and a second authentication result after identity authentication on the requester according to the second identity authentication information;

an authentication result interacting module configured to construct an access authentication response message comprising the second authentication result according to the first authentication result and send the access authentication response message to the access controller, and to receive an access response message sent from the access controller; and a transmitter that transmits messages and a receiver that receives messages.

9. An authentication server comprising:

an authentication request receiving module configured to receive an identity authentication request message sent from a requester, wherein the identity authentication request message comprises first identity authentication information of an access controller of a destination network and second identity authentication information of the requester;

an authentication performing module configured to generate a first authentication result after identity authentication on the access controller according to the first identity authentication information and to generate a second authentication result after identity authentication on the requester according to the second identity authentication information;

an authentication response sending module configured to construct an identity authentication response message and send the identity authentication response message to the requester, wherein the identity authentication response message comprises the first authentication result and the second authentication result; and a transmitter that transmits messages and a receiver that receives messages.

10. An access controller comprising:

an access request receiving module configured to receive an access request message sent from a requester;

an access authentication request constructing module configured to construct an access authentication request message comprising first identity authentication information and send the access authentication request message to the requester, wherein the first identity authentication information is identity authentication information of the access controller;

an access authentication response receiving module configured to receive an access authentication response message sent from the requester to obtain a second authentication result, wherein the access authentication response message is constructed by the requester according to a first authentication result and the first authentication result and the second authentication result are sent from an authentication server to the requester in an identity authentication response message; and wherein the first authentication result is generated by the authentication server after performing identity authentication on the access controller according to the first identity authentication information comprised in an identity authentication request message sent from the requester, and the second authentication result is generated by the authentication server after performing identity authentication on the requester according to second identity authentication information comprised in the identity authentication request message;

an access response sending module configured to construct an access response message according to the obtained second authentication result and an authorization policy and send the access response message to the requester; and a transmitter that transmits messages and a receiver that receives messages.

* * * * *